Sept. 7, 1954   R. J. PHAIR ET AL   2,688,582
METHOD OF FORMING LAMINATED SHEETS
Filed July 31, 1952
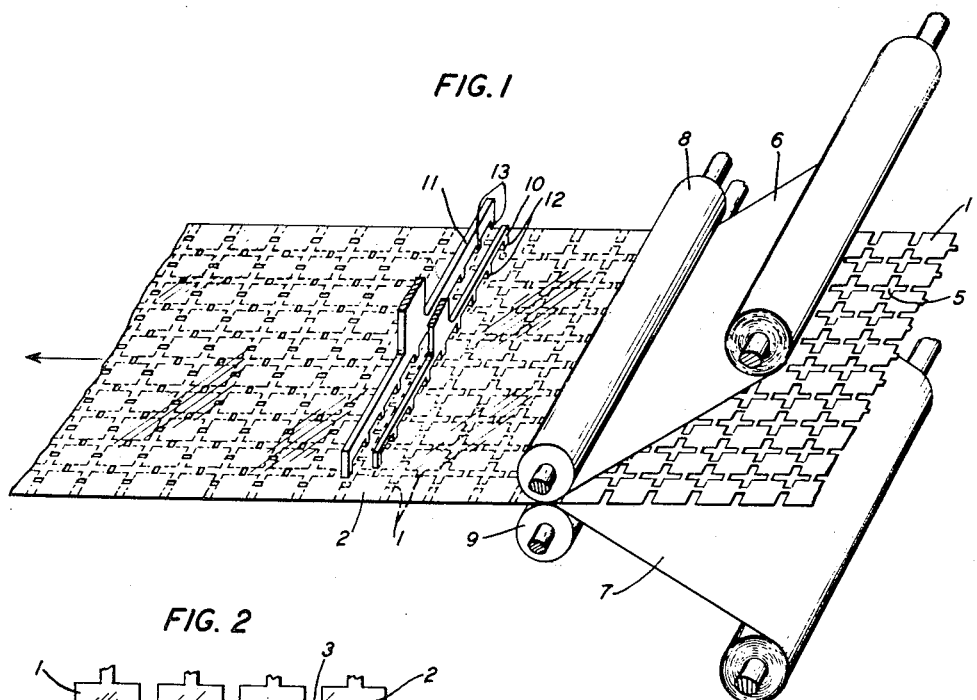
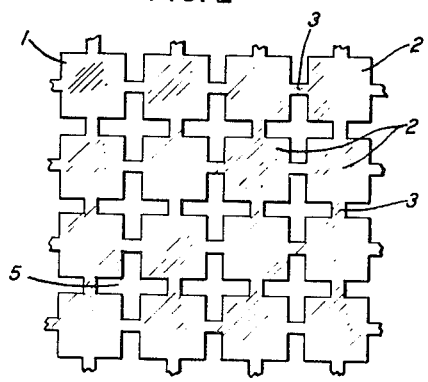
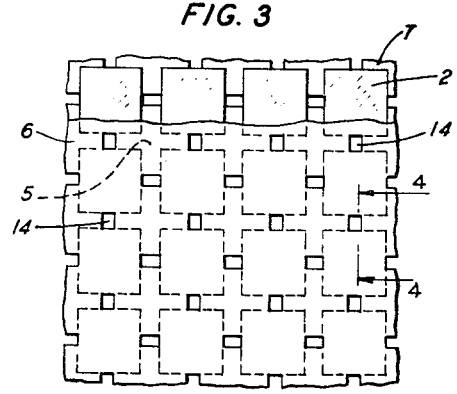
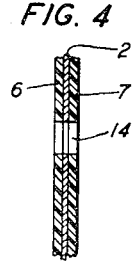
INVENTORS R. J. PHAIR
R. C. PLATOW
BY
Edwin B. Cave
ATTORNEY Patented Sept. 7, 1954

2,688,582

UNITED STATES PATENT OFFICE 2,688,582

METHOD OF FORMING LAMINATED SHEETS

Robert J. Phair, Hoboken, and Raymond C. Platow, Morristown, N. J., assignors to Bell Telephone Laboratories, Incorporated, New York, N. Y., a corporation of New York Application July 31, 1952, Serial No. 301,856

7 Claims. (Cl. 154—125)

This invention relates to methods of forming laminated structures in which geometric shapes of electrically conductive material, such as metal sheet or foil are securely maintained in a spaced relationship in a single plane. More particularly, it relates to methods of forming microwave lens sheets having such a structure.

One form of microwave lens designed to provide horizontal and vertical polarization is made up of a plurality of spaced vertical planes each containing a plurality of spaced areas of high conductivity. The present invention provides a relatively simple and effective procedure for forming sheets capable of providing said vertical planes containing spaced conductive areas. This procedure can best be described by reference to the accompanying drawing in which:

Fig. 1 is a perspective view of a laminated sheet in the process of manufacture according to the present invention with the significant elements of the machine for manufacturing the sheet being shown;

Fig. 2 is a plan view of a perforated metal sheet such as is used in the manufacture of the laminated sheet shown in Fig. 1;

Fig. 3 is a plan view of a portion of the finished laminated sheet with a portion of the upper lamina broken away; and Fig. 4 is a sectional view of the laminated sheet of Fig. 3 with the section being taken along the line 4—4 of Fig. 3.

In the manufacture of the laminated sheet of the present invention, the conductive elements may be formed of a metal sheet or foil 1 which is initially perforated as shown in Fig. 2 to provide a plurality of geometric shapes 2 joined together by narrow bridges 3. In the embodiment as shown in the drawing, the perforations 5 are cruciform so that the residual geometric shapes 2 are square. For the formation of a microwave lens these squares may conveniently be of the order of one-half inch in size. The connecting bridges 3 may conveniently have a width between one-eighth and one-third of the width of the squares.

The perforated metal sheet 1 is interposed between two sheets of flexible insulating material 6, 7 as shown in Fig. 1. These two sheets which may conveniently be formed of a flexible plastic are pressed together and caused to adhere to one another through the perforations 5 in the metal sheet 1. This adhesion between the flexible sheets may be accomplished by coating them on the side facing the metal sheet with a suitable adhesive or solvent. However, preferably the sheets are formed of a heat sealable plastic such as polyethylene. When sheets of such a material are employed, they can be caused to adhere to one another, through the perforations 5, by passing them between a pair of rolls 8, 9 which are heated to a temperature sufficient to soften the plastic sheets and to cause them to adhere to one another.

The final sheet is produced by punching out those portions of the laminated structure in which the connecting bridges 3 are located. This is shown as accomplished in Fig. 1 by the use of a pair of multiple punches 10, 11. These punches reciprocate vertically and, in so doing, the punch fingers 12 of the multiple punch 10 punch out rectangular pieces from the composite sheet which correspond to the areas occupied by the bridges linking the metal squares 2 across the width of the sheet, whereas the punch fingers 13 of the multiple punch 11 punch out rectangular areas corresponding to the areas occupied by the bridges linking the metal squares 2 along the length of the sheet. In the resulting sheet shown in Fig. 3, the metal squares 2 are no longer connected by the connecting bridges. These metal squares are securely held in place between the plastic sheets 6, 7 which are securely adhered together in the cruciform regions 5. Although there is very little adherence between the metal squares and the plastic sheets, the adhesion between the two plastic sheets is sufficient to retain the squares firmly in place. The plastic sheets 6 and 7 are perforated with a plurality of holes 14 corresponding to the areas in which the connecting bridges 3 were formerly located.

The invention has been described above in terms of specific embodiments and since certain modifications and equivalents may be apparent to those skilled in the art, this description is intended to be illustrative of, but not necessarily to constitute a limitation upon, the scope of the invention.

What is claimed is:

1. The method of forming a sheet in which a plurality of geometric shapes of metal sheet are securely maintained in a single plane in spaced relation, which method comprises disposing between two sheets of a flexible material a metal sheet having perforations disposed over its surface so as to leave the residual metal defining said plurality of geometric shapes disposed in said spaced relationship and connected together by narrow bridges, adhering said flexible sheets to one another at their points of contact with one another through said perforations to form a unitary laminated structure and removing, from said laminated sheet structure, the areas in which said connecting bridges are situated so as to isolate said geometric shapes from one another.

2. The method of forming a microwave lens sheet in which a plurality of geometric shapes of electrically conductive sheet material are securely maintained in a single plane in spaced relation in which they are electrically insulated from one another, which method comprises disposing, between two sheets of a plastic insulating material, an electrically conductive sheet material having perforations disposed over its surface so as to leave the residual electrically conductive material defining said plurality of geometric shapes disposed in said spaced relationship and connected together by narrow bridges, adhering said plastic sheets to one another at their points of contact with one another through said perforations to form a unitary laminated structure, and punching from said laminated sheet structure the areas in which said connecting bridges are situated so as to isolate said geometric shapes electrically from one another.

3. The method as described in claim 2 wherein the plastic sheets are sheets of heat sealable material and wherein the adherence of these sheets at their points of contact is caused by pressing them together at an elevated temperature.

4. The method as described in claim 3 wherein the plastic sheets are sheets of polyethylene.

5. The method of forming a microwave lens sheet in which a plurality of rectangular pieces of metal sheet are securely maintained in a single plane in spaced relation in which they are electrically insulated from one another, which method comprises disposing, between two sheets of a plastic insulating material, a metal sheet having a plurality of aligned cruciform perforations disposed over its surface so as to leave the residual metal in the form of said plurality of spaced rectangular pieces connected together by narrow bridges, adhering said plastic sheets to one another at their points of contact with one another through said perforations to form a unitary laminated structure and punching from said laminated sheet structure the areas in which said connecting bridges are situated without removing any substantial part of the areas in which said rectangular pieces are situated, so as to isolate said rectangular pieces electrically from one another.

6. The method as described in claim 5 wherein the plastic sheets are sheets of heat sealable material and wherein the adherence of these sheets at their points of contact is caused by pressing them together at an elevated temperature.

7. The method as described in claim 6 wherein the plastic sheets are sheets of polyethylene.

References Cited in the file of this patent

UNITED STATES PATENTS

| Number | Name | Date |
| --- | --- | --- |
| 2,003,494 | Reynolds | June 4, 1935 |
| 2,081,538 | Hoarle | May 25, 1937 |
| 2,214,842 | Sweet et al. | Sept. 17, 1940 |
| 2,551,796 | Fitzpatric et al. | May 8, 1951 |
| 2,568,458 | Nichols | Sept. 18, 1951 |
| 2,653,889 | Hager | Sept. 29, 1953 |